US010945178B2

(12) United States Patent
Spapis et al.

(10) Patent No.: US 10,945,178 B2
(45) Date of Patent: Mar. 9, 2021

(54) DEVICES AND METHODS FOR STEERING END DEVICES BETWEEN NETWORKS

(71) Applicant: HUAWEI TECHNOLOGIES CO., LTD., Guangdong (CN)

(72) Inventors: Panagiotis Spapis, Munich (DE); Chan Zhou, Munich (DE); Alexandros Kaloxylos, Munich (DE); Chenghui Peng, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/374,312

(22) Filed: Apr. 3, 2019

(65) Prior Publication Data
US 2019/0281520 A1   Sep. 12, 2019

Related U.S. Application Data

(63) Continuation of application No. PCT/EP2016/073782, filed on Oct. 5, 2016.

(51) Int. Cl.
*H04W 36/14* (2009.01)
*H04W 88/06* (2009.01)
(Continued)

(52) U.S. Cl.
CPC ............ *H04W 36/14* (2013.01); *H04W 4/40* (2018.02); *H04W 8/06* (2013.01); *H04W 48/20* (2013.01);
(Continued)

(58) Field of Classification Search
CPC ... H04W 4/50; H04W 4/60; H04W 8/00–245; H04W 88/00–06; H04W 92/00; H04W 92/04; H04W 92/10
See application file for complete search history.

(56) References Cited

U.S. PATENT DOCUMENTS 8,611,280 B2   12/2013   Morera et al.
9,198,210 B2   11/2015   Phan et al.
(Continued)

FOREIGN PATENT DOCUMENTS

CN   102450086 A   5/2012
CN   103733683 A   4/2014
(Continued)

OTHER PUBLICATIONS

"3rd Generation Partnership Project; Technical Specification Group Services and System Aspects;Study on Architecture for Next Generation System(Release 14)", 3GPP Standard; 3GPP TR 23.799, vol. SA WG2, No. V1.0.2, Sep. 30, 2016, pp. 1-423, XP051172701.
(Continued)

*Primary Examiner* — San Htun
(74) *Attorney, Agent, or Firm* — Womble Bond Dickinson (US) LLP

(57) ABSTRACT

A device is provided for operating in a communication system that comprises a plurality of individual networks. The device comprises one or more subscriber modules for assisting the device to attach to a network. The number of those one or more subscriber modules is fewer than the number of the plurality of networks. The device being configured to initiate a pre-attach procedure to attach itself to all of the plurality of networks before it establishes a connection with one of those networks. It is also configured to connect to one of the plurality of networks for communicating data with that network while remaining attached to the others of the plurality of networks. The advantage of a device that pre-attaches to more than one network is that it significantly reduces the time needed for the device to switch later from being connected to one network to another network.

9 Claims, 12 Drawing Sheets

(51) Int. Cl.
*H04W 76/15* (2018.01)
*H04W 4/40* (2018.01)
*H04W 8/06* (2009.01)
*H04W 48/20* (2009.01)
*H04W 60/00* (2009.01)

(52) U.S. Cl.
CPC ............ *H04W 76/15* (2018.02); *H04W 60/00* (2013.01); *H04W 88/06* (2013.01)

(56) References Cited

U.S. PATENT DOCUMENTS

| | | | |
|---|---|---|---|
| 2010/0075680 | A1 | 3/2010 | Ramachandran et al. |
| 2010/0216465 | A1* | 8/2010 | Mubarek ............... H04W 48/18 455/435.1 |
| 2010/0304737 | A1 | 12/2010 | Jain et al. |
| 2011/0065436 | A1 | 3/2011 | Svedevall et al. |
| 2012/0258766 | A1 | 10/2012 | Cho |
| 2014/0066055 | A1 | 3/2014 | Balakrishnan et al. |
| 2014/0274006 | A1* | 9/2014 | Mutya ..................... H04W 4/16 455/416 |
| 2014/0342776 | A1* | 11/2014 | Viswanadham .. H04W 52/0274 455/558 |
| 2015/0109995 | A1* | 4/2015 | Mathai .................... H04W 8/08 370/328 |
| 2015/0296364 | A1* | 10/2015 | Peruru ................ H04W 60/005 455/434 |
| 2015/0358807 | A1 | 12/2015 | Gorey et al. |
| 2016/0135231 | A1* | 5/2016 | Lee ....................... H04W 68/12 370/329 |
| 2016/0295550 | A1* | 10/2016 | Sharma ................. H04L 1/1825 |
| 2016/0345151 | A1* | 11/2016 | Chen ..................... H04W 48/18 |

FOREIGN PATENT DOCUMENTS

| | | |
|---|---|---|
| CN | 105188108 A | 12/2015 |
| JP | 2016511622 A | 4/2016 |
| JP | 2016111660 A | 6/2016 |
| WO | 2014102335 A1 | 7/2014 |
| WO | 2014151583 A1 | 9/2014 |
| WO | 2015136040 A1 | 9/2015 |
| WO | 2016006929 A1 | 1/2016 |

OTHER PUBLICATIONS

Huawei et al: "RRC Support for Network Slicing", 3GPP Draft;R2-1701216, Feb. 12, 2017, XP051211905, 4 pages, Best Available Date: Feb. 13-17, 2017.

Huawei: "Solution for Selection of Network Slice and CN entity", 3GPP Draft;R3-162460, Oct. 6, 2016, XP051152108, 4 pages, Best Available Date: Oct. 10-14, 2016.

Huawei: "Key principles for Support of Network Slicing in RAN", 3GPP Draft;R3-162461, Oct. 6, 2016, XP051152109, 4 pages, Best Available Date: Oct. 10-14, 2016.

3rd Generation Partnership Project; Technical Specification Group Services and System Aspects;Study on Architecture for Next Generation System(Release 14), 3GPP Standard;3GPP TR 23.799, vol. SA WG2, No. V0.4.0, Apr. 27, 2016, XP051123410, 96 pages.

Road Traffic Estimates:Great Britain 2014 (R). Statistical Release, Dec. 21, 2015, 17 pages.

R. Trivisonno et al, Towards Zero Latency Software Defined 5G Networks. 2015 IEEE International Conference on Communication Workshop (ICCW), Sep. 14, 2015, 6 pages.

"3GPP TS 23.401 V14.0.0 (Jun. 2016), 3rd Generation Partnership Project;Technical Specification Group Services and System Aspects;General Packet Radio Service (GPRS) enhancements for Evolved Universal Terrestrial Radio Access Network (E-UTRAN) access(Release 14), 374 pages", Best Available: Jun. 2016.

3GPP TS 23.122 V13.5.0 (Jun. 2016), 3rd Generation Partnership Project; Technical Specification Group Core Network and Terminals; Non-Access-Stratum (NAS) functions related to Mobile Station (MS) in idle mode(Release 13), 49 pages, Best Available: Jun. 2016.

"3GPP TR 36.885 V2.0.0 (Jun. 2016), 3rd Generation Partnership Project; Technical Specification Group Radio Access Network;Study on LTE-based V2X Services;(Release 14), 220 pages".

LG Electronics, TR 36.885 v2.0.0 on Study on LTE-based V2X Services, for approval. 3GPP TSG-RAN Meeting #72 Busan, Korea, Jun. 13-16, 2016, RP-160790, 1 page.

Intel, "Discussion on Interworking options",SA WG2 Meeting #116-BIS,S2-164773,Aug. 29-Sep. 2, 2016, Sanya, P. R. China, total 7 pages.

3GPP TS 23.251 V13.2.0 (Jun. 2016);3rd Generation Partnership Project;Technical Specification Group Services and System Aspects;Network Sharing;Architecture and functional description(Release 13);Total 39 Pages, Best Available Date: Jun. 2016.

\* cited by examiner

DEVICES AND METHODS FOR STEERING END DEVICES BETWEEN NETWORKS

CROSS REFERENCE TO RELATED APPLICATIONS

This application is a continuation of International Application No. PCT/EP2016/073782, filed on Oct. 5, 2016, the disclosure of which is hereby incorporated by reference in its entirety.

TECHNICAL FIELD

The embodiments of the present invention relates to devices and methods for operating in multi-network environments, and particularly to environments in which end devices are mobile.

BACKGROUND

It is common for the networks of competing mobile operators to have coverage areas that overlap. Mobile devices normally attach and operate under one operator only, so at during power-on they will search for and select a network of the operator with whom they have a subscription. This is denoted the Home Public Land Mobile Network (HPLMN). If their operator is not present in an area—which will usually occur when the mobile device is abroad—the end device will perform "roaming" and attach to a Visiting Public Land Mobile Network (VPLMN).

This process has been quite adequate up until now. It is inefficient, however, for the new use cases that will have to be supported in the near future with the arrival of 5G cellular networks. More specifically, it has been identified that vehicle-to-vehicle or vehicle-to-pedestrian communication will need to be addressed for a multi-operator environment, since the end devices cannot be assumed necessarily to operate under a single operator. This requirement raises a number of technical challenges which need to be addressed by cellular networks. In particular, vehicle-related communication (which is one of the typical 5G use case families referred as "V2X"), has some very specific requirements in terms of delay and reliability. For example, information needs to be exchanged within between 5 and 100 msec (depending on the scenario) and transmitted with between 99 and 99.999% reliability (again depending on the scenario).

Existing technical solutions are not suitable for tackling the problems of supporting end-devices in a multi-operator environment. Moreover, there are other key issues for future cellular networks that have to be tackled. One of these key issues is future cellular networks will have to support so-called "network slices". A "network slice" is a fully operational logical network that includes all the required protocols and network resources. It has been suggested in 3GPP TR 23.799 V0.4.0 (2016-04), "Study of Architecture for Next Generation System" (Release 14) that end devices will be able to communicate through two different slices. This is similar to the case of a multi-operator environment (where a device also has to communicate through multiple logical networks) even though there is only one administrative entity in the "slicing" case.

SUMMARY

It is an object of the embodiments of the present invention to provide concepts that enable the efficient steering of moving devices in a multi-network environment.

The foregoing and other objects are achieved by the features of the independent claims. Further implementation forms are apparent from the dependent claims, the description and the figures.

According to a first aspect, device is provided for operating in a communication system that comprises a plurality of individual networks. The device comprises one or more subscriber modules for assisting the device to attach to a network. The number of those one or more subscriber modules is fewer than the number of the plurality of networks. The device being configured to initiate a pre-attach procedure to attach itself to all of the plurality of networks before it establishes a connection with one of those networks. It is also configured to connect to one of the plurality of networks for communicating data with that network while remaining attached to the others of the plurality of networks. The advantage of a device that pre-attaches to more than one network is that it significantly reduces the time needed for the device to switch later from being connected to one network to another network. This enables the device to be quickly steered from one network to another, which addresses one of the main obstacles to the practical implementation of autonomous driving, namely meeting the specific delay requirements for that particular use case when vehicles are moving at speed. The device is also configured to perform this pre-attach for more networks than it has subscriber modules, which is advantageous since it is impractical to provide a device with a subscriber module for all available networks.

The device may be configured to connect to said one of the plurality of networks in dependence on parameters including one or more of: a location of the device, a load of one or more of the networks, and a type of service that can be accessed through one or more of the networks. The device is thus able to take a number of different factors into account when deciding which network to connect to. By selecting a network in dependence on its location, the device is able to operate in a communication system that assigns end devices to a particular network in dependence on a geographical location of the device. By selecting a network in dependence on a network loading, the device is able to facilitate load balancing. By selecting a network in dependence on a type of service offered by one or more of the networks, the device is able to tailor the network selection to its own specific requirements.

The device may be configured to operate in a connected mode with respect to a network with which it is connected and in an idle mode with respect to a network to which is attached. The device thus operates in an appropriate mode for its level of attachment to a particular network. This minimises the number of control functions that the device has to perform for a network that it is only attached to while maintaining sufficient interaction to keep the attachment, which reduces connection time if the device later wants to connect to that network.

The device may be configured to initiate the pre-attach procedure by transmitting an attach request to one of the plurality of networks that indicates that it needs to attach to more than one network and thereby trigger a pre-attach procedure with all of the plurality of networks. This minimises the signalling load that the pre-attach procedure places on the air interface. By specifying the multi-attach requirement in the attach request the device pushes responsibility for coordinating the multi-attach to the networks, meaning that the signalling burden falls predominantly on the networks cores.

The device may be configured to initiate the pre-attach procedure by transmitting an individual attach request to each of the plurality of networks that indicates that it needs to attach to that respective network. This enables the device to implement a pre-attach procedure even when it is abroad and has to fulfil the requirement to update its HPLMN.

The device may be configured to connect to one of the plurality of networks in dependence on configuration information about that network that it receives from a network during the pre-attach procedure or that it receives from a network during a connection with another of the plurality of networks. The device may thus be in possession of the configuration information it needs to connect to a network before it requires that connection, which again helps to speed up the switch from one network to another.

The device may be configured to attach to one of the plurality of networks in parallel with, or sequentially to, attaching to the others of the plurality of networks. By attaching to the plurality of networks in parallel, the device is capable of completing the pre-attach efficiently and quickly. By attaching to the plurality of networks sequentially, the device is capable of completing the pre-attach in a manner that does not overload either its own capabilities or the resources of the network.

The device may be configured to initiate the pre-attach procedure in dependence on triggering events that include one or more of: switch-on of the device; a determination that the device is approaching a border of a zone that is assigned to a different one of the plurality of networks from a network that the device is currently attached to; and receipt of information from a network relating to network loading and/or a type of service that can be accessed through one or more of the plurality networks. The device can thus be configured to access the advantages of the pre-attach in any situation in which there is a possibility that the device might want to subsequently connect to a network that it is not currently attached to. Implementing the pre-attach in advance of any future connection means that any future connection can be established more quickly.

The device may be configured to switch to being connected to another of the plurality of networks in dependence on an internally-generated instruction and/or in dependence on an externally-generated instruction received from one of the plurality of networks. By switching networks in dependence on an internally-generated instruction, the device is able to make the switch in dependence on factors that it is best placed to know, such as what type of service it requires. By switching networks in dependence on an externally-generated instruction, the device is able to make the switch in dependence on factors that the network is best placed to know, such as the respective loading of different networks. It also allows the network to control how end devices are assigned to different networks, by enabling a network to force a switch from one network to another.

According to a second aspect, a method is provided that comprises a device, operating in a communication system that comprises a plurality of individual networks, initiating a pre-attach procedure to attach itself to all of those plurality of networks before establishing a connection with one of those networks. The device comprises one or more subscriber modules for assisting the device to attach to a network. The number of those one or more subscriber modules is fewer than the number of the plurality of networks The method also comprises the device connecting to one of the plurality of networks for communicating data with that network while remaining attached to the others of the plurality of networks.

According to a third aspect, a communication system is provided that comprises a plurality of individual networks whose coverage areas overlap and a plurality of end devices that are located in the overlapping coverage area. The end devices are capable of communicating wirelessly with the plurality of networks. The communication system is configured to divide the overlapping coverage area into two or more zones and assign each zone to one of the plurality of networks. The communication system is also configured to arrange communications between the end devices and the plurality of networks so that every end device that is located in a particular zone of the overlapping coverage area communicates with the network that is assigned to that zone. This enables control and user plane functions to operate under minimum delay and avoids unnecessary tasks or crossing of communication paths that would otherwise occur if the end devices in one area were being served by multiple different networks and/or operators. This addresses one of the main obstacles to the practical implementation of autonomous driving, namely enabling fast data exchange between devices that are grouped together physically (e.g. because they are in cars travelling together on a motorway) but which are likely to be subscribed to a number of different operators.

The communication system may be configured to assign each zone to a different one of the plurality of networks. This spreads the responsibility for handling communications with the end devices between the available networks.

The communication system may be configured such that an end device that moves from being located in a first zone to a second zone switches from communicating with the network assigned to the first zone to communicating with the network assigned to the second zone. This enables the separation of responsibility for different geographical zones to be maintained even when the end devices are mobile and moving from one zone to another.

According to a fourth aspect, a method is provided that comprises dividing a common coverage area, which represents an overlap between the coverage areas of a plurality of individual networks, into two or more zones. The method comprises assigning each zone to one of the plurality of networks. The method also comprises arranging communications between a plurality of end devices that are located in the common coverage area and the plurality of networks so that every end device that is located in a particular zone of the common coverage area communicates with a network that is assigned to that zone.

According to a fifth aspect, a network gateway is provided that is configured to operate as part of first individual network in a communication system that comprises a plurality of individual networks. The network gateway is configured to receive an attachment request from a second one of the individual networks in respect of an end device that wants to attach to the first network. It is configured to identify a component within the first network for implementing the requested attachment and forward the attachment request to the identified component. The network gateway is thereby configured to protect the topology of the first network from being exposed to the second network. The network gateway thus enables a network to participate in a multi-attach scheme without having to reveal the secrets of its network arrangement to other operators.

According to a sixth aspect, a network device is provided that is configured to operate as part of first individual network in a communication system that comprises a plurality of individual networks. The network device is configured to receive an attachment request from an end device in the first network that indicates that the end device needs to attach to more than one network. It is configured to send an attachment request to one or more other networks in the plurality of networks. The network device is also configured to receive an attachment confirmation from each of those one or more networks confirming that an attach process in respect of the end device is complete. The network device is thus configured to coordinate a multi-attach process on behalf of the end device, which enables the signalling burden to be carried predominantly by the networks cores. This minimises the signalling load that the pre-attach procedure places on the air interface.

The network device may be configured to receive configuration information from the one or more other networks to enable the end device to communicate with each of those networks. The network device may be configured to forward that configuration information to the end device. By forwarding configuration information to the end device, the network enables that device to very quickly connect to one of those networks in the future. Collecting that information together into one message again helps to minimise the signalling load that the pre-attach procedure places on the air interface.

BRIEF DESCRIPTION OF DRAWINGS

The present embodiments of the present invention will now be described by way of example with reference to the accompanying drawings. In the drawings.

DESCRIPTION OF EMBODIMENTS

Figure 1:
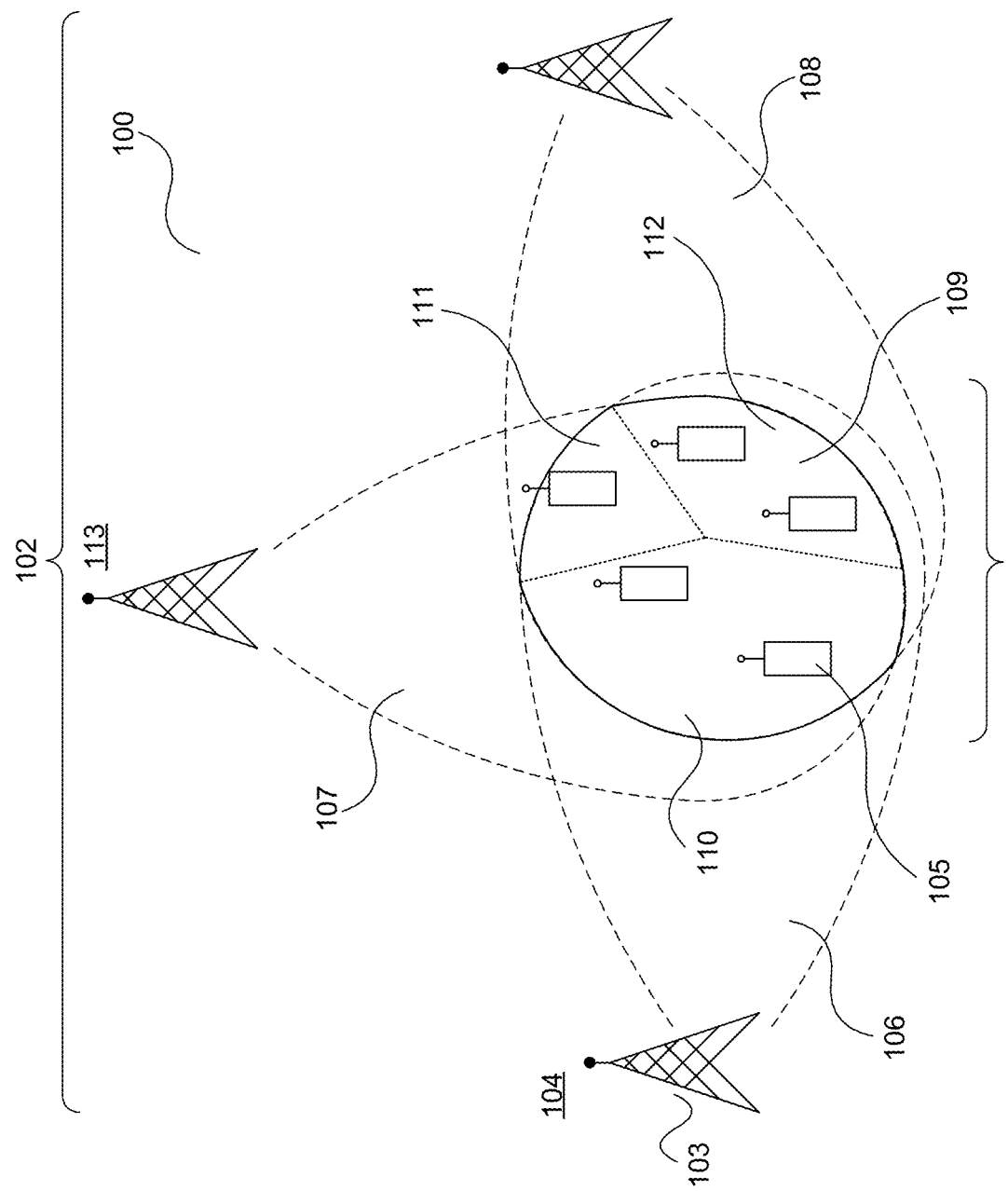
FIG. 1 shows an example of a communication system according to one embodiment of the invention.

An example of a communication system is shown in FIG. 1. The communication system 100 comprises a plurality of end devices 101 that are remote from the networks 102 and configured to communicate wirelessly with them via an appropriate communication protocol. These end devices are generally denoted as user equipment or "UE" herein and they could be any device with a wireless communication capability, including e.g. autonomous vehicle control systems, GPS navigation systems, mobile phones, smart phones, laptops, tablets etc.

The communication system comprises a plurality of individual networks 102. Each network represents a logical network that is operational independent of the other networks. The networks may be run by the same or different operators and may represent different "slices" of an overall network run by a single operator. The networks 102 may thus represent a multi-operator environment, a multi-slice environment or any combination to the two.

The networks are individual in the sense that they are different from each other. Different networks comprise different functionalities. In particular, different networks will tend to have different functionality in at least one of the following: the networks operate in different spectrum; the networks have separate authorization and/or authentication procedures; the networks apply different transmission technologies, e.g. CDMA, OFDM.

Each network is represented illustratively in FIG. 1 by a base station 103 that may be any apparatus that is capable of direct wireless communication with end devices 101. This apparatus forms part of the radio access domain of network 104. Each network suitably includes backhaul and core domains in addition to the radio access domain. Each network has a respective coverage area 106 to 108, and these coverage areas overlap to form an area of overlapping coverage 109 in which the plurality of end devices 101 are located.

Each end device 101 is preferably capable of communicating wirelessly with every one of the plurality of networks 102. Suitably each network is configured to use the same communication protocol. Any suitable communication protocol might be employed. Some embodiments are described below with reference to a specific example in which all of the networks implement one of the Long Term Evolution (LTE) standards developed by the 3GPP, but this is for the purposes of example only.

According one embodiment, the communication system is configured so that all end devices located in the same geographical area are forced operate under the same network. This enables control and user plane functions to operate under minimum delay. It also avoids any unnecessary tasks or crossing of communication paths that would otherwise be needed if the user equipment were being served by multiple networks and/or multiple operators. This idea is applicable to both multi-operator and multi-sliced environments. Some sections of this document may use mainly the "multi-operator" terminology but it should be understood that this does not diminish the applicability of the method in the multi-sliced environment.

The aim of having all user equipment operating in the same geographical area communicating with same network is achieved by dividing the area of overlapping coverage into a number of zones 110 to 112. Each zone represents a particular geographical area. A zone may be defined by a particular radio coverage area. A zone may be defined using GPS coordinates or any other system that can clearly identify a border between neighbouring zones, such as base station identification numbers. Each zone is assigned to one of the networks 102. Suitably each zone is assigned to a different network from the other zones. For example, zone 110 may be assigned to network 104 while zone 111 may be assigned to network 113. Each zone is the operational domain of the network that is assigned to it. Communications between the end devices and the networks are arranged such that each end device communicates with the network that is assigned to its zone. The user equipment 105 in zone 110 thus communicates with network 104 and so on.

From a practical perspective it is assumed that operators that provide mobile services in a particular country/region will reach an agreement between them about which operator will take responsibility for specific zones. It is also possible that networks will decide dynamically about which network is going to serve end devices in a specific zone. For example, one factor that might be relevant to a dynamic allocation is the relative loading of the different networks.

Figure 2:
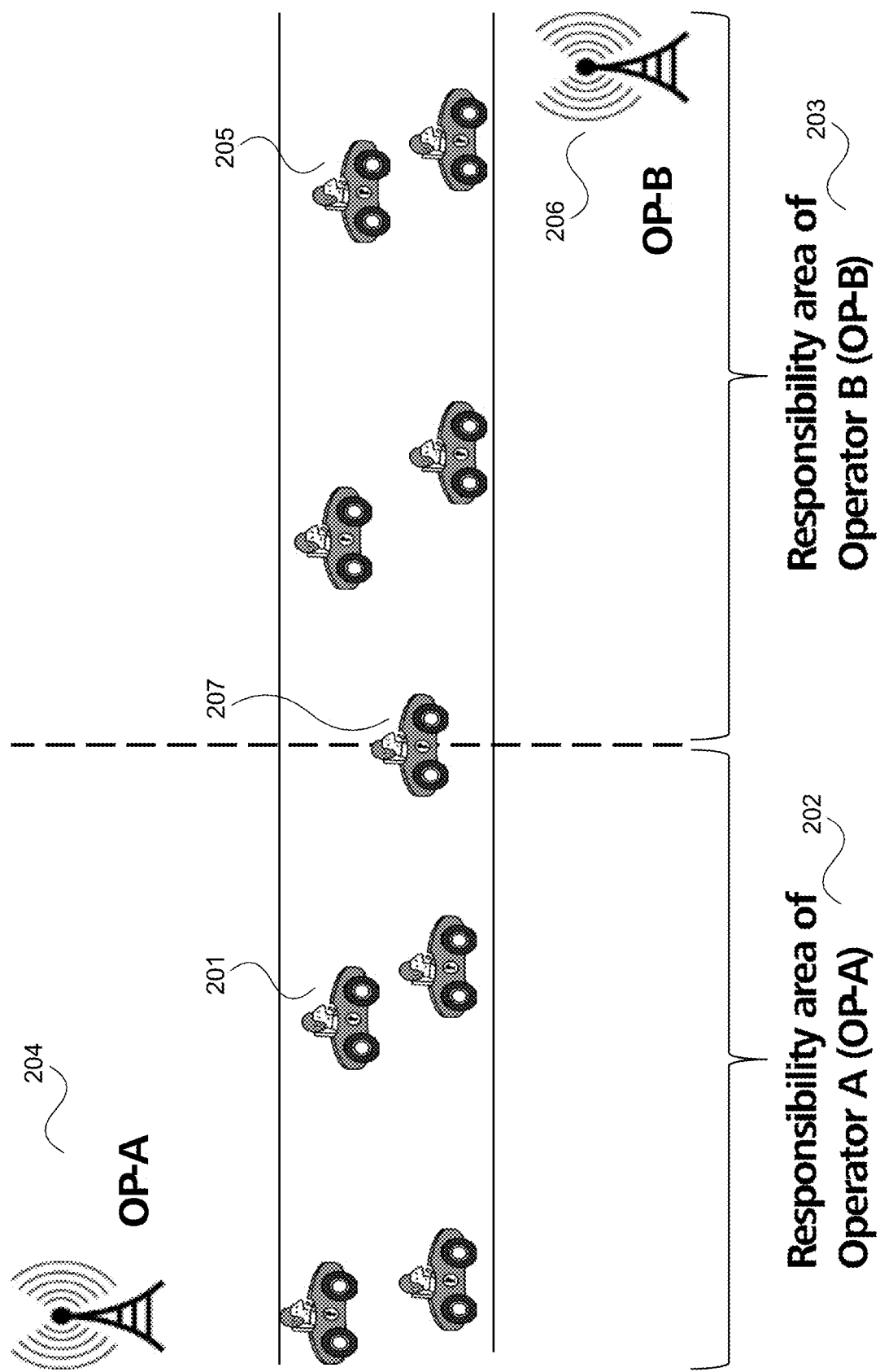
FIG. 2 shows an example of multiple vehicles being attached to a network in dependence on their location.

A simple example of how this scheme might operate in practice is shown in FIG. 2, in which all communicating vehicles 201 on the left-hand side of the figure in zone 202 are served by Operator A via network 204 while those on the right hand side of the FIG. 205 in zone 203 are served by Operator B via network 206. If an end device moves from one zone to another, it preferably likewise changes the network that it communicates with. The communication system is configured such that an end device that moves from being located in a first zone to a second zone (such as end device 207 is in the process of doing) changes from communicating with the network assigned to the first zone to communicating with the network assigned to the second zone.

The concepts described herein are applicable for end devices operating inside one country and also for end devices operating between different countries since the main principle (i.e. forcing all devices located in the same area to operate under the same operator) is applicable for both cases.

One important aspect of the concepts described herein is the ability of end devices that cross the border between one zone and another to be able to switch from one operator to another or from one network slice to another without facing any unnecessary delays. For example, in the national roaming scheme (which is used only when the HPLMN has no coverage of a specific area), the delay that is experienced before the end device attaches to a network is significant since the device needs to scan for available networks and perform an attach process that may take a few seconds. Such delay will not be acceptable by future systems like communicating vehicles that require seamless service provision even when they are crossing the border between two operators or between two separate logical networks.

In one embodiment, a mechanism for achieving fast switching is to have the end devices attach to multiple networks concurrently. Although attached in multiple networks, an end device does not necessarily use all of them to exchange data. The end device is instead configured to "pre-attach" to multiple networks, in order to minimise the time needed to subsequently steer the end device from one network to another.

Figure 3:
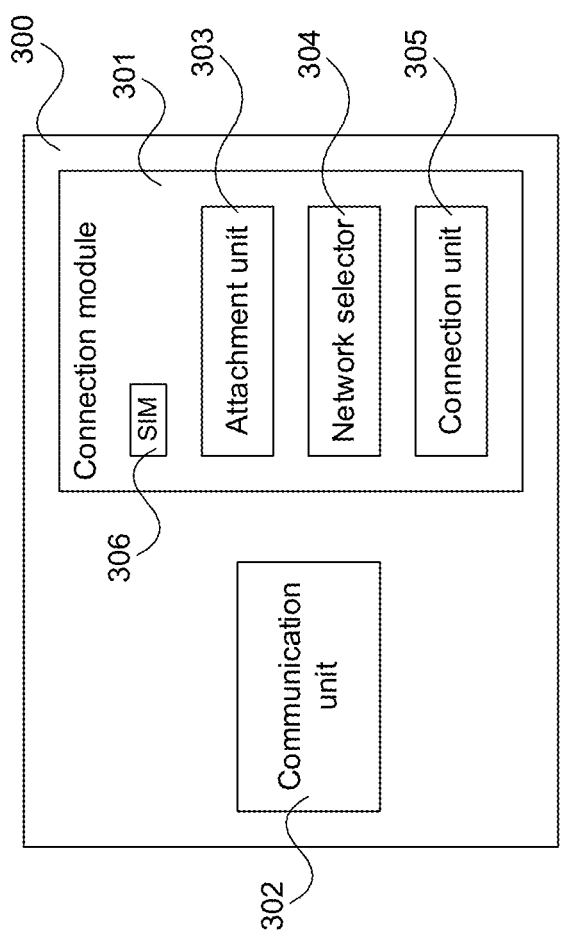
FIG. 3 shows an example of an end device according to one embodiment of the invention.

An example of a device that is configured to pre-attach to multiple networks is shown in FIG. 3. The device 300 comprises a connection module 301 and a communication unit 302. The connection module further comprises an attachment unit 303, a network selector 304 and a connection unit 305. The connection module also comprises a subscriber module 306. The device is suitably configured to operate as part of the communication system 100 shown in FIG. 1. The device shown in FIG. 3 may be one of the end devices 101 or a part thereof. The attachment unit 301 is suitably configured to exchange information with a plurality of networks via communication unit 302. The communication unit is preferably capable of wirelessly communicating with the plurality of networks 102 shown in FIG. 1 via any suitable wireless communication protocol.

In the example of FIG. 3, the subscriber module is shown as being a subscriber identity module (i.e. a SIM card) but the subscriber module could be any component that performs one or more functions usually assigned to SIM cards in an end device. For example, the subscriber module may be any component that is configured to identify and authenticate an end device with a network. The subscriber module may store one or more pieces of information that enable it to perform this function, including one or more identities for the end device, security, authentication and ciphering information and a list of services that the user has access to.

The attachment unit (303) is configured to pre-attach the device to a plurality of networks before it tries to connect to any of those networks. The device might be configured to pre-attach to any number of networks, but it is preferably configured to attach to more than two. Suitably it does this by initiating a pre-attach process. The pre-attach may be triggered by an event internal to the device or by an external event, such as the device receiving an instruction or information from the network. For example, the attachment unit may perform the pre-attach on switch-on or power-up of the device. (In some implementations the device 300 may form part of a larger apparatus, in which case switch-on or power-up of the device may happen at the same time as the larger apparatus is switched on or at a different time). The attachment unit might also perform a pre-attach if it is already connected to a network but it predicts that it might want to connect to a different network, one that it is not already attached to, in the near future. One example of this is a scenario where the device is approaching the border between a zone that is served by one network and a zone that is served by another network. If those two zones are in different countries, for example, the device might be attached to all of the available networks in its current zone but none of the available networks in the zone it is approaching. Other reasons that the device might have for expecting its connection to switch from one network to another include the relative loading of the networks and another network offering a type of service that its current network does not.

Once the device is attached to each of the plurality of networks, the connection unit (305) in connection module 301 connects the device to one of those networks via communication unit 302. In most usage scenarios the device will only be connected to one network at a time. It retains its attachments to a plurality of networks, however, as this gives it the ability to quickly change from one network to another, e.g. when it moves from the zone assigned to one network to a zone that is assigned to another network.

The device has one or more subscriber modules. The device may have a subscriber module for each network but in a preferred embodiment the device's total number of subscriber modules is fewer than the number of the plurality of networks that the device is configured to attach to. In most embodiments the device is expected to only have a single subscriber module. There are some devices are already configured to attach to more than one network, but these devices are dual-SIM phones that are designed to be able to connect to two different operators. A dual-SIM arrangement can be useful, for example, if a user wants to use the same smartphone for business and personal purposes or if the user wants to have a different subscription for data services than for voice services. Dual SIM devices can attach to two networks, so they are configured to attach to the same number of networks as they have SIM cards. In principle, the multi-SIM approach could be used to attach to all available networks, as described herein. However, for most areas the number of available networks is greater than two and the complexity of the device increases considerably if more than two SIM cards are used. Moreover, the number of available networks is different in different geographical areas, so it is not practical to design a system in which a device attaches to all available networks around a multi-SIM implementation. Embodiments of the device described herein are able to implement a multi-attach process whatever the number of SIM cards in a device and even if the device only has a single SIM card (which will be the case in most implementations).

A device is considered to be "attached" to a network when it is registered with that network. At this stage the device is in possession of the configuration information that it needs to connect to the network but it is not yet connected to the network. This may mean, as will become apparent from the examples below, that fixed network bearers have been established, that appropriate policies may apply to those bearers, and/or that authentication of the device may have been performed. Radio resources will not, however, have been allocated to the device for communicating data with the network. The device may be configured to operate in an "idle" mode with respect to networks that the device is only attached to. The "idle" mode may be similar to the RRC IDLE state defined by the LTE protocol, in that the device does not yet have access to the radio resources of the network.

Note that a device may have to connect to one or more networks as part of an initial attachment to the network. This is so that the device can relay control plane information to the network as part of the attachment process. In some current communication standards, a default data bearer is automatically established if a device attaches to a network, but this bearer lapses if not used for a predetermined amount of time, automatically releasing the radio resources and causing the device to switch to an idle state. The device might also need to occasionally transmit data to a network to retain its attached status, in which case it briefly connects to the network to access the required radio resources for the transmission before returning to its attached state.

A device is considered to be "connected" to a network when in addition to the abovementioned attach procedure, it has also been allocated radio resources by that network. At this stage the device is able to exchange data through the network. The device may be configured to operate in a "connected" mode with respect to networks that the device is connected to. The "connected" mode may be similar to the RRC CONNECTED state defined by the LTE protocol, in that the device has access to radio resources for the transmission of data.

In a preferred embodiment the device is configured to pre-attach with all available network operators, even if the device: (i) is not associated with a subscription to that operator; and (ii) is not in coverage of one of those operator's networks. In most scenarios, at least one of the networks that the device attaches to (and remains attached to) will be a network in which the device is a visitor. The operators that are deemed to be "available" are likely to be determined in dependence on the location of the device. The relevant geographical area for determining the available operators is preferably quite large and certainly larger than the zones that can determine which specific network a device should use. For example, the relevant geographical area for determining the available operators might be a city or a state or even a country.

Figure 4:
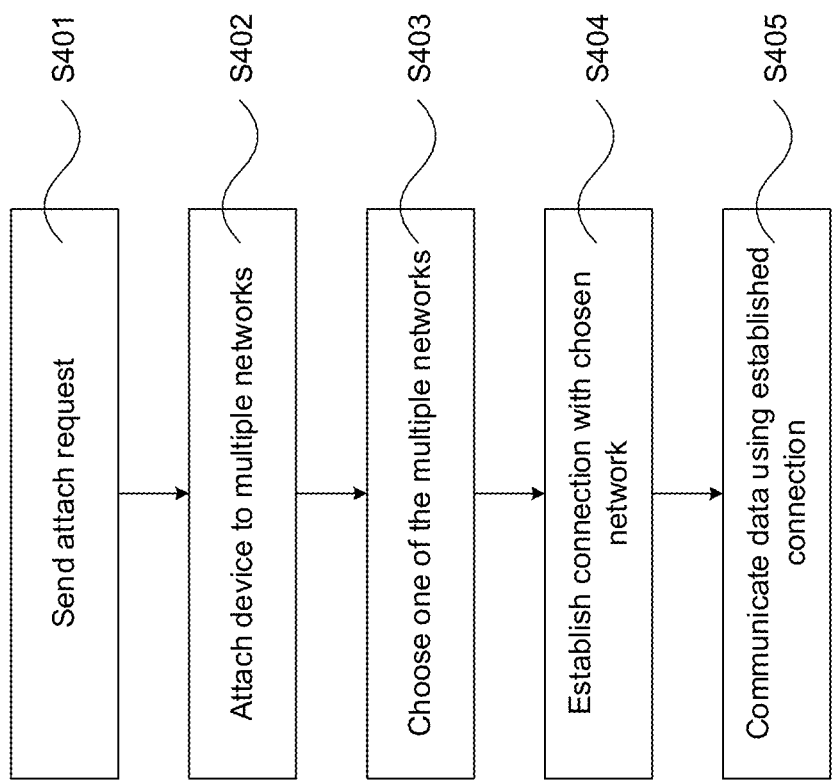
FIG. 4 shows an example of a process for an end device to attach to multiple networks.

FIG. 4 gives an overview of a process for pre-attaching a device to multiple networks according to one embodiment. The process is initiated by the attachment unit 303 causing communication unit 302 to send an attach request (operation S401). In some embodiments the device may send this attach request to just one network. By indicating in the attach request that it needs to attach to multiple networks, the device triggers a pre-attach procedure with multiple networks. In this scenario the pre-attach procedure may be predominantly handled by the networks (this is described in more detail below). In other embodiments the device may send individual attach requests to multiple networks. In this scenario the pre-attach procedure may be predominantly handled by the device (this is also described in more detail below). In the next stage of the process the device attaches to multiple networks (operation S402). The device enters its attached mode of operation with each of those networks. The device may attach to one network in parallel with other networks or sequentially, as will become apparent from some of the specific signalling examples described below. The device chooses one of the networks that it has attached to (operation 403) and connects to that chosen network (operation S404). The device is then able to communicate data with the network via the radio resources allocated to it during the connection process (operation S405).

The network selector (304) in device 300 is preferably configured to choose one of the networks for the device to connect to. In some scenarios the device may receive instructions from one of the networks telling it which network to attach to, in which case the network selector follows those instructions. In other scenarios the device may make the decision based on the information available to it. The network selector may make this decision based on one or more of a number of parameters. One parameter that the network selector may take into account is the location of the device. This is particularly true where the device is operating in a network configured like the network in FIG. 1, in which devices located in specific zones are forced to use particular networks. The device might also operate in a network that is not so strictly configured, in which case its choice of network might not be constrained by its location. This might be the situation, for example, where at least some of the networks that the device is attached to are network slices belonging to the same operator rather than networks belonging to different operators. Thus the network selector may take other parameters into account, such as the relative loading of the different networks or the particular type of service that it wants to access compared with the type of services that are offered by each individual network.

The network selector (304) is preferably configured to inform the connection unit (305) about the network that has been selected for connection. The connection unit then controls the communication unit (302) to establish the connection with the chosen network. The connection unit is configured to achieve this using configuration information relevant to the chosen network. Such information could include, for example, the eNB to be used from a plurality of eNBs of the same operator available in an area, scheduled timing intervals, allocated frequencies, power control parameters etc. The configuration information is usually obtained by the device from one of the networks. In some scenarios the device may request that information, in others it may be pushed to the device by a network. The configuration information is typically received by the device from one of the networks as part of the pre-attach procedure. Configuration information may also be received by the device at other times. For example, a network may periodically transmit configuration information to all devices that are connected to it. The device may also receive configuration information from one network while it is connected to another. For example, if the device performs a pre-attach when it approaches the boundary between one zone and another it may receive configuration information from a different network from the network that it is currently connected to. The device then uses that configuration information to switch its connection from one network to another.

The structures shown in FIG. 3 (and all the block apparatus diagrams included herein) are intended to correspond to a number of functional blocks. This is for illustrative purposes only. FIG. 3 is not intended to define a strict division between different parts of hardware on a chip or between different programs, procedures or functions in software. In some embodiments, some or all of the signalling techniques described herein will be coordinated wholly or partly by a processor acting under software control. That software can be embodied in a non-transitory machine readable storage medium having stored thereon processor executable instructions for implementing some or all of the signalling procedures described herein. For the end device the processor could, for example, be a central processor of an autonomous vehicle control system, a GPS navigation system, mobile phone, smartphone, tablet, generic IoT device or any other device with wireless communication capability.

Some or all of the signal processing operations described herein might also be performed wholly or partly in hardware. This particularly applies to techniques incorporating repetitive operations, such as the formation of standard messages. It also applies to transmit and receive techniques; any transmitters and receivers described herein are likely to include dedicated hardware to perform functions such as frequency mixing, code cover mixing, symbol demapping, frequency transforms, subcarrier demapping etc.

The specific components found in any transmitters and receivers incorporated in communication unit 302 will be dependent on the exact waveform and telecommunications protocol that the device is configured to implement. One or more implementations of the embodiments of the present invention are described below with reference to an application in which the receiver is configured to operate in accordance with a 3GPP LTE standard. This is for the purposes of example only; it should be understood that the scope of the embodiments of the present invention is not limited to any particular waveform or telecommunications protocol and any suitable waveform or telecommunications protocol could be used.

The pre-attach between the device and the network may be achieved via any suitable mechanism. Two particular examples are described below. In one example the pre-attach process is largely coordinated by the networks. In the other example the pre-attach process is largely coordinated by the device. Both of these examples are described below with reference to particular implementations in which the end device is termed a "user equipment" and the user equipment is configured to initially attach to its HPLMN. Each of the other networks is consequently termed a VPLMN.

Network Attachment: Network Coordinated

Figure 5:
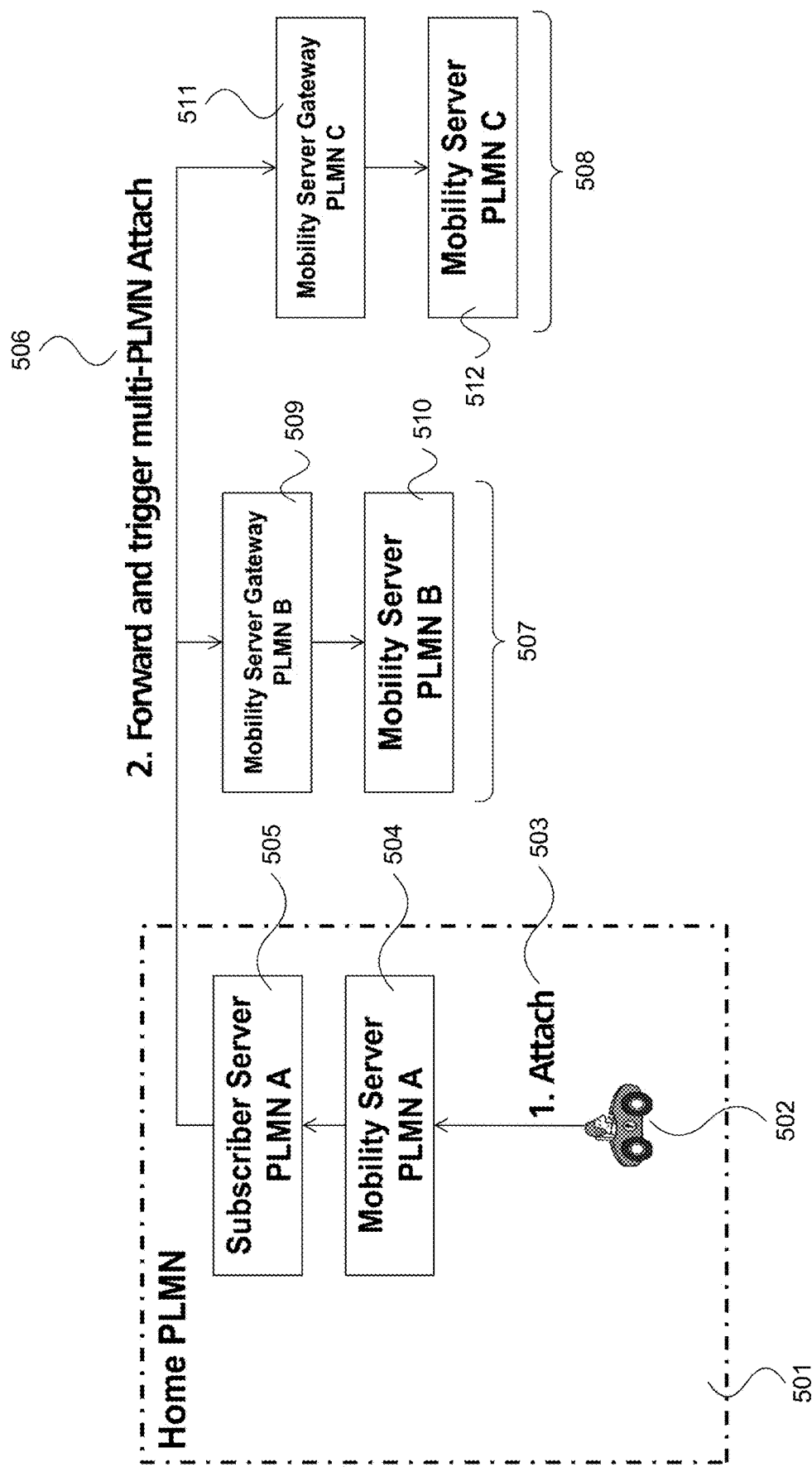
FIG. 5 shows an example of an end device achieving multi-attach in a multi-network domain.

FIG. 5 illustrates a scenario in which an end device is in a vehicle 502. The device sends an attach request 503 and initially attaches to a network, which in this example is Home Public Land Mobile Network 501 (HPLMN). This is the network with which the device has a subscription. The attach request is initially handled by the mobility server 504 in the device's home network. The device preferably specifies in the attach request that wants to attach to multiple networks. The mobility server passes the request to the subscriber server 505 of the HPLMN, which triggers the attachment (i.e. the registration of the same vehicle) through the core network with all of the other available operators (506). In the example of FIG. 5 there are three operators available—A to C—which each have their own network (507, 508).

The mobility servers (504, 510, 512) suitably implement similar functionalities to those covered by the Mobility Management Entity (MME) according to current LTE standards. The subscriber server (505) covers similar functions to the Home Subscriber Server (HSS) in LTE networks. The concepts described herein also introduce a mobility server gateway (509, 511), which is configured to receive the attachment messages from the subscriber server of the HPLMN (501). The mobility server gateway is optional but it does enable the topological information of the VPLMNs to be invisible to the HPLMN. The mobility server gateway thus protects an operator's topology from being exposed to other operators. If there is no need to keep the network topology invisible (e.g. if the networks 502 to 509 are multi-sliced rather than multi-operator, since all "slices" will belong to the same operator) then the mobility server gateway is not required.

Figure 6:
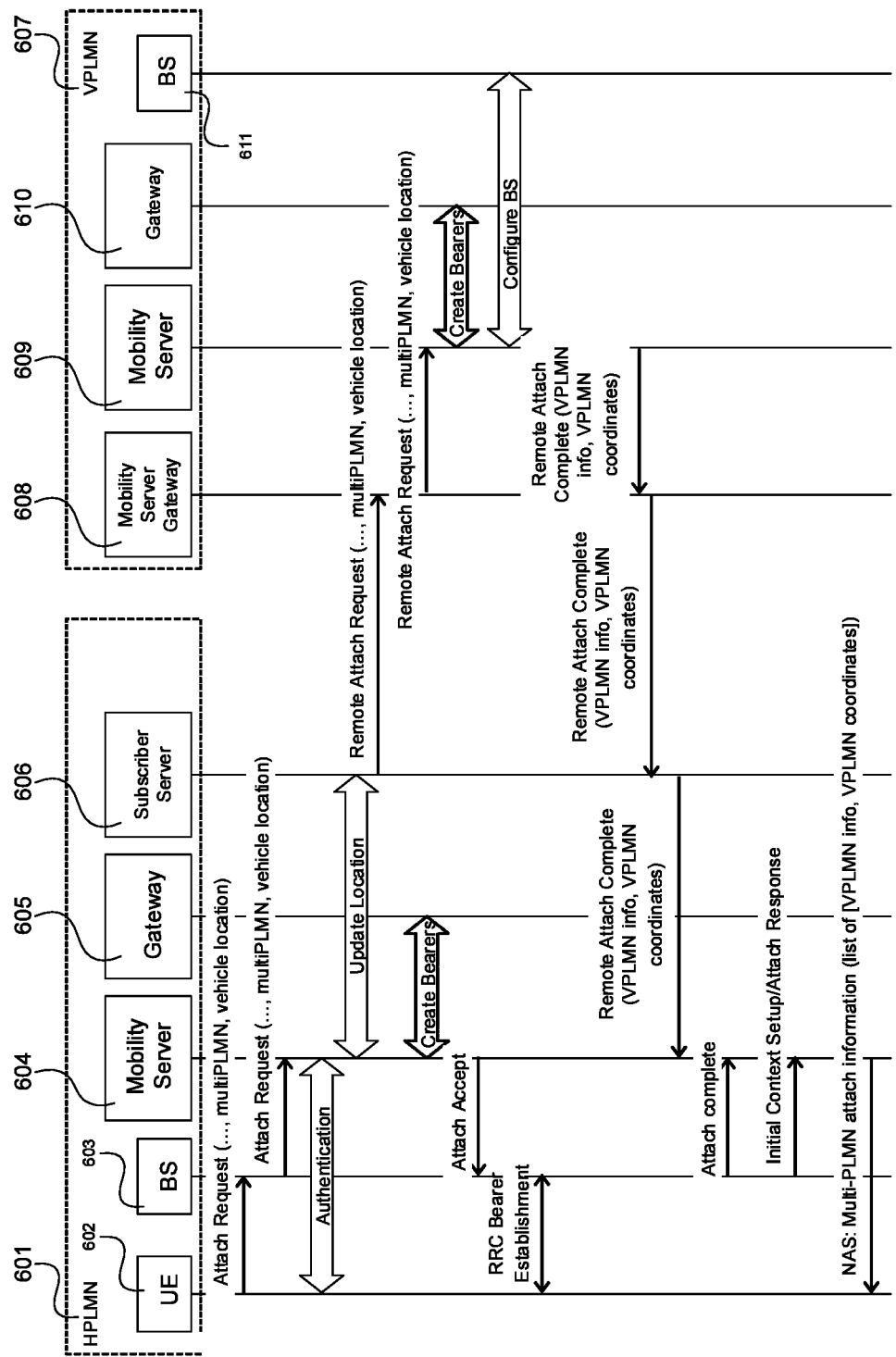
FIG. 6 shows an example of a network-coordinated signalling exchange for a user equipment to achieve multi-attach in a multi-network domain.

FIG. 6 illustrates an example of a signalling exchange for a pre-attachment process that is largely coordinated by the networks. Initially, the user equipment 602 initiates the attach procedure by transmitting an attach request. This message suitably includes a network related device identifier for the user equipment (e.g. the International Mobile Subscriber Identity (IMSI)) together with base station-related parameters about the selected network, which is the HPLMN 601 in this example. The user equipment also indicates that this is a "multi-PLMN" attach message. It may also transmit its current location (e.g. in terms of GPS coordinates). Based on this information, the base station 603 that receives the attach request selects the most appropriate mobility server 604 in the HPLMN for handling the request and forwards the attach message to it.

In the next stage the user equipment is authenticated by the HPLMN (601). After authentication, the establishment of bearers and the configuration of network components takes place in the core network. A location update also suitably takes place, during which the subscriber server 606 is notified about the new location of the user equipment, the selected mobility server (604) and the "multi-PLMN" nature of the attach. The subscriber server interprets the "multi-PLMN" nature of the attach as meaning that the user equipment should be attached to all other available PLMNs.

The subscriber server 606 sends a remote attach request to mobility server gateway 608 of the other networks. In the example of FIG. 6 these other networks are represented by Visitor' PLMN (VPLMN) 607. The remote attach request informs the other networks that the user equipment 602 needs to attach to them. In the example of FIG. 6 the remote attach request is received by the mobility server gateway 608. As mentioned above, the mobility server gateway is an optional device used only if the remote PLMN operators do not want to expose their topology (e.g. the placement of their mobility servers) to other operators.

The mobility server gateway 608, upon receiving the remote attach request, selects the most appropriate mobility server 609, which in turn will select the most appropriate base station 611 and configures any required bearers from gateway 610 (which could be a router or similar device) to the base station. It will also perform any required configuration at the base station (e.g. by denoting that the user equipment is attached and in idle mode). When these operations are completed, the mobility server 609 will forward a "remote attach complete message" to the mobility server gateway, from where it is subsequently forwarded to the HPLMN 601. The "remote attach complete message" suitably includes configuration information for the user equipment to use if it ever switches from being connected to HPLMN 601 to being connected to VPLMN 607. It also suitably includes zone for which this VPLMN should be used by the use equipment. The zone may be identified by a set of geographical coordinates.

The configuration information that the user equipment receives from each of the available networks may include but is not limited to, the following information:
temporary identifiers for the user equipment to use in that network,
power control configuration parameters,
H-ARQ parameters,
timing values,
operator region,
PHY layer numerology (e.g. TTI values, modulation schemes, coding schemes etc).

Suitably the configuration information that is collected together by the networks is sent to the user equipment as a single message. In FIG. 6 this is denoted by a Non Access Stratum (NAS) signalling of the message "multi-PLMN attach information". This message may contain data that is similar to that is transferred in current 3GPP LTE standards by the RRC CONNECTION SETUP message.

At the end of the signalling exchange shown in FIG. 6 the user equipment is attached to all available PLMNS (only one of which is shown in the figure). The user equipment is also in possession of configuration information for all of the networks that it is attached to, which enables it to connect to its chosen network.

In the example of FIG. 6, the attachment of the user equipment to the plurality of networks is achieved primarily by exchanging signalling over the core network. The attach process is typically a "heavy" process in terms of signalling so it is preferred to carry this signalling over the core network rather than the bottleneck of the wireless interface. This approach avoids increasing the load on the wireless interface, irrespective of how many PLMNs are available for the user equipment to attach to.

Network Attachment: Device Coordinated

Figure 7:
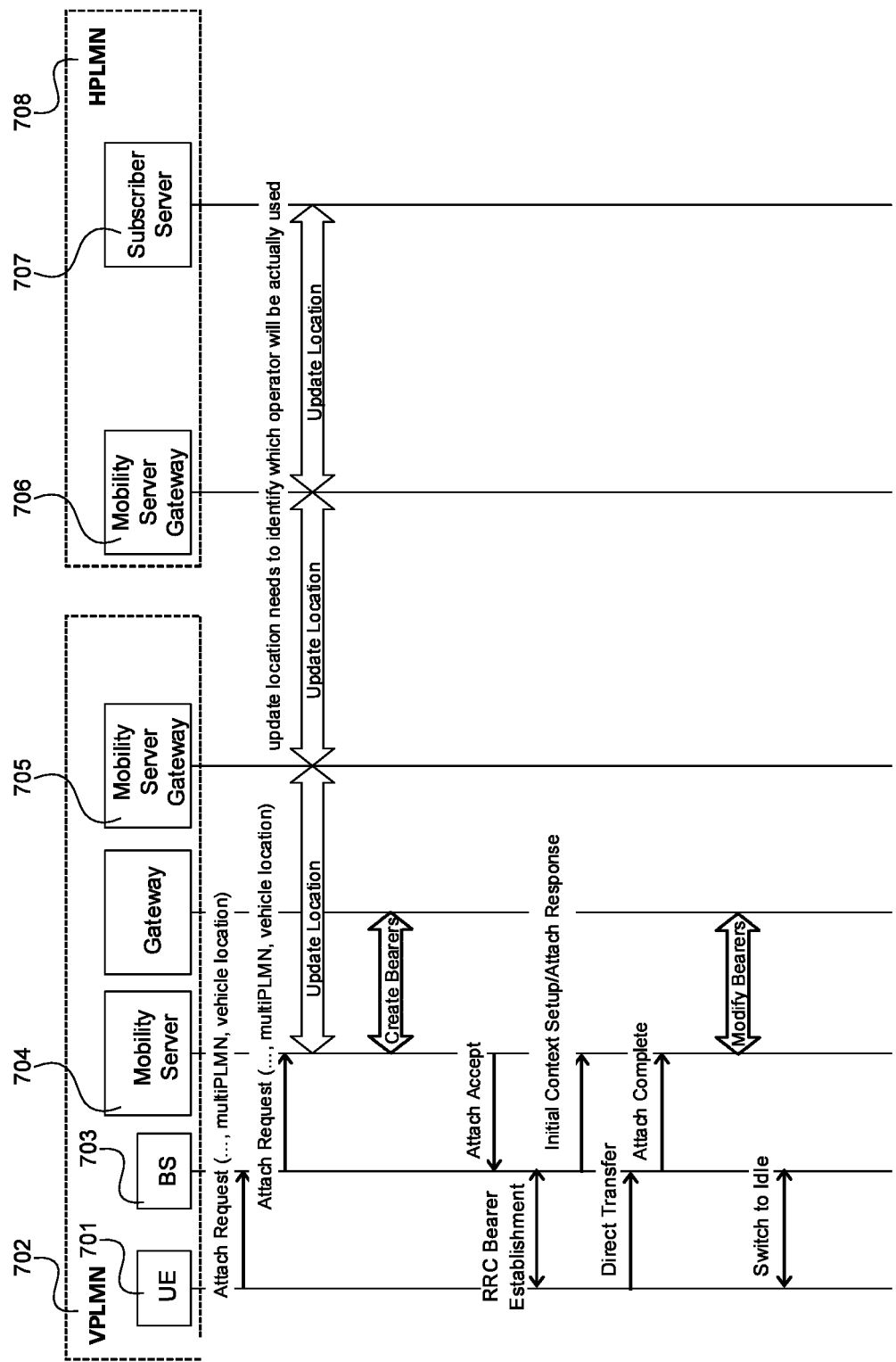
FIG. 7 shows an example of a device-coordinated signalling exchange for a user equipment to achieve multi-attach in a multi-network domain.

FIG. 7 illustrates an example of a signalling exchange for a pre-attachment process that is largely coordinated by the user equipment. In this scenario the user equipment attaches to multiple networks independently. This is different from conventional end device configurations in which a user equipment is configured to initiate an attach process with only one network at a time.

FIG. 7 shows the signalling exchange between a user equipment 701 and a VPLMN 702. As before, the user equipment initiates the attach procedure by transmitting an attach request. In this example authentication is not performed, because the VPLMN is not the user equipment's home network. The base station 703 that receives the attach request selects the most appropriate mobility server 704 in the VPLMN for handling the request and forwards the attach message to it. The mobility server 704 in turn forwards the location update to HPLMN 708 via mobility server gateways 705, 706 so that subscriber server 707 can be updated. The attachment of the user equipment to the VPLMN thereafter follows a similar procedure as FIG. 6. In FIG. 7 the device is shown as adopting an idle mode of operation with respect to VPLMN 702 once the attachment is complete, e.g. because VPLMN is not assigned to serving terminals in the geographical area where the user equipment 701 current resides.

The individual attachment approach exemplified in FIG. 7 may not be advantageous on a national level because all terminals need to initiate an attach to all available networks, which creates a signalling load on the wireless interface. However, the individual attachment approach may be inevitable on an international level, where the registration of a user equipment with a VPLMN abroad is likely to require the update of the user equipment's HPLMN (in a similar way to what is done for international roaming currently).

There are certain key elements to note in the signalling exchanges described above:
1. The attach request indicates that multi-PLMN registration may be required and includes the location of the user.
2. Upon the receiving the attach request the subscriber server registers the user equipment with all available VPLMNs. The subscriber server may contact a mobility server gateway of the other PLMNs regarding this registration request. The presence of the mobility server gateway protects the VPLMN from having its topology exposed.
3. The mobility servers in the VPLMNs configure their base station and receive all relevant information as if their own base station were involved in an RRC connection setup with a user equipment. The mobility servers also transfer all the relevant information to another PLMN so that it can be forwarded to a user equipment served by that other PLMN.
4. The registration of the user equipment with multiple PLMNs can take place in parallel and all configuration information for these PLMNs is transferred to the user equipment.
5. Data bearers are created in the fixed network part of all attached PLMNs, so that the time for switching from one PLMN to another is kept to a minimum.

The user equipment operates in an idle mode with the networks it is attached to. This may require the user equipment to perform selected control actions with each of those networks. An example is location management. The user equipment operates in connected mode with the network it is connected to. This may require the user equipment to perform all typical control actions with the connected network. An example is cell selection/re-selection.

The attachment to different networks can take place when the user equipment is powered-on and/or when it approaches a boundary between two areas. The second option may minimise the number of the attachments that have to take place (e.g. because a user equipment could be powered-on and remain within the same area until it is powered-off). Consequently, it may also minimise the number of networks for which the user equipment has to perform a number of control processes while operating in an idle mode (e.g. location updates).

Network Selection

A user equipment may decide which network to use in dependence on information from a variety of sources. These may include, but are not limited to: (a) information acquired during an initial attachment to its HPLMN; (b) information acquired during a location update process; (c) information received periodically from a network that it is attached or connected to; (d) information received based on its current location; (e) information retrieved from a network by transmitting an explicit request for that information; and (f) information obtained using a combination of any of (a) to (e).

The user equipment may select a network through which to transfer data based on different parameters, which may include, for example, the geographical location of the device, the congestion levels of one or more of the networks and a type of service offered by one or more of the networks.

Switching From One Network to Another

For selecting when to switch from one operator to another, there are two main options. The first option is for the user equipment to decide on its own when to switch from one network to another. The user equipment suitably bases this decision on one or more of: information received from a network about which network is serving which geographical area, its current position (e.g. in terms of GPS coordinates, the currently serving base station etc) and/or non-location related information such as potential network load, type of service provided etc.

An alternative solution is for a network to force the user equipment to switch from one operator to another using an explicit signal. This is may be termed "forced roaming". A network may send this explicit signal in response to a number of different events. For example, in one scenario the user equipment may attach to its HPLMN but the HPLMN forces it to switch to another network (e.g. VPLMN B) because it has been agreed that the other network is serving all of the user equipment in the specific geographical area where the user equipment is located. Another example scenario is where the user equipment performs a location update that indicates to the network that it is approaching the border with a geographical area that is served by another network. Another example would be a scenario in which for reasons of network loading some user equipment needs to switch from one network to another. This last example is very applicable to a multi-sliced environment.

Figure 8:
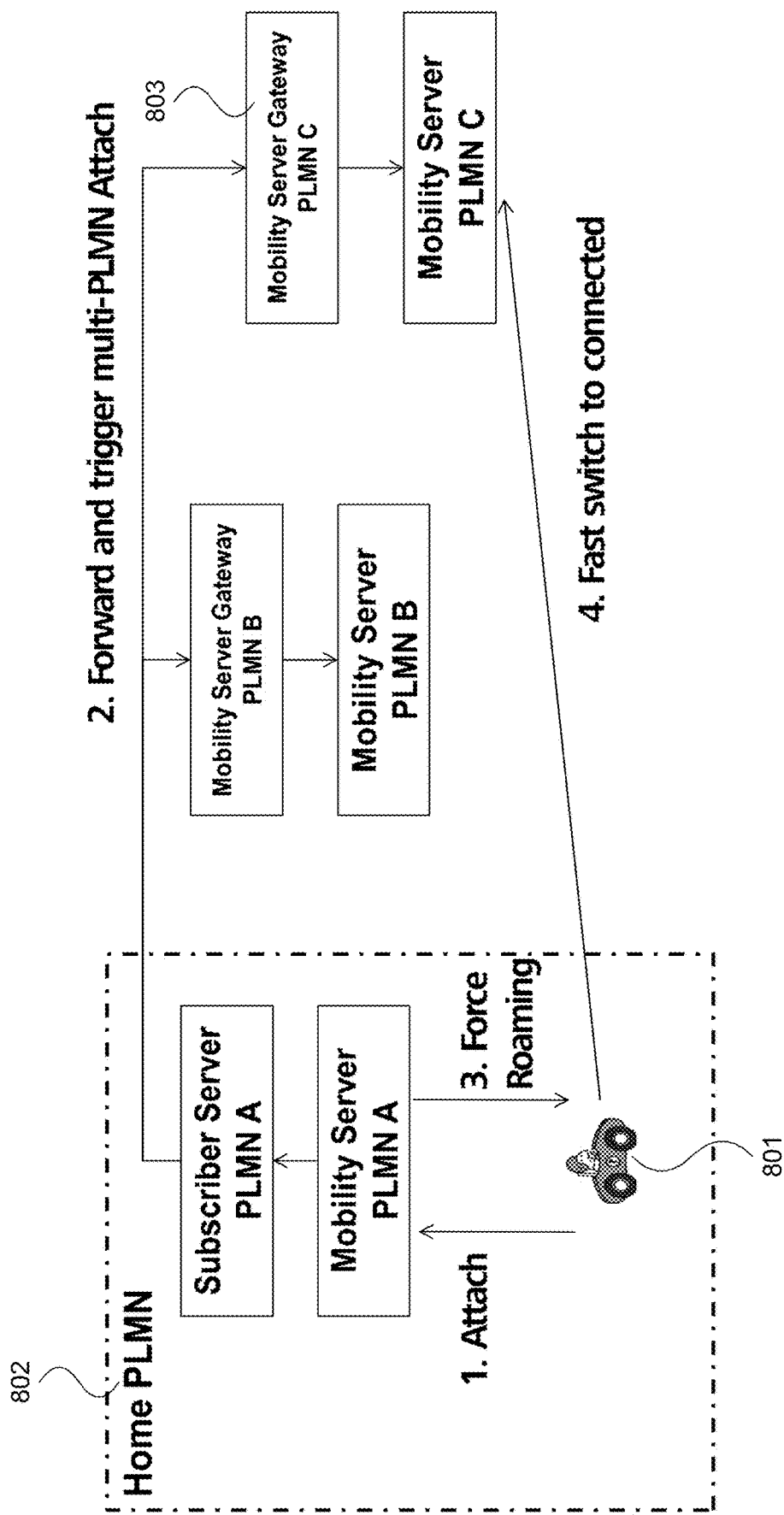
FIG. 8 shows an example of a forced roaming procedure in a multi-network domain.

An example of forced roaming is shown in FIG. 8. In FIG. 8, a "forced roaming" message triggers a user equipment 801 to switch from being connected to HPLMN A (802) to being connected to PLMN C (803).

The "forced roaming" message that the network sends to the user equipment may contain information related to which PLMN the user equipment should switch to, including one or more of:

information about configuration modes (e.g., encoding, modulation), physical layer numerologies (e.g. waveforms, TTI duration), timers, power control configuration information.

The "forced roaming" message may contain information that a user equipment usually acquires either by monitoring broadcasting channels or through explicit signalling channels. One advantage of including this information in the "forced roaming" message is that it may help to minimise the switching time from one network to another.

Figure 9:
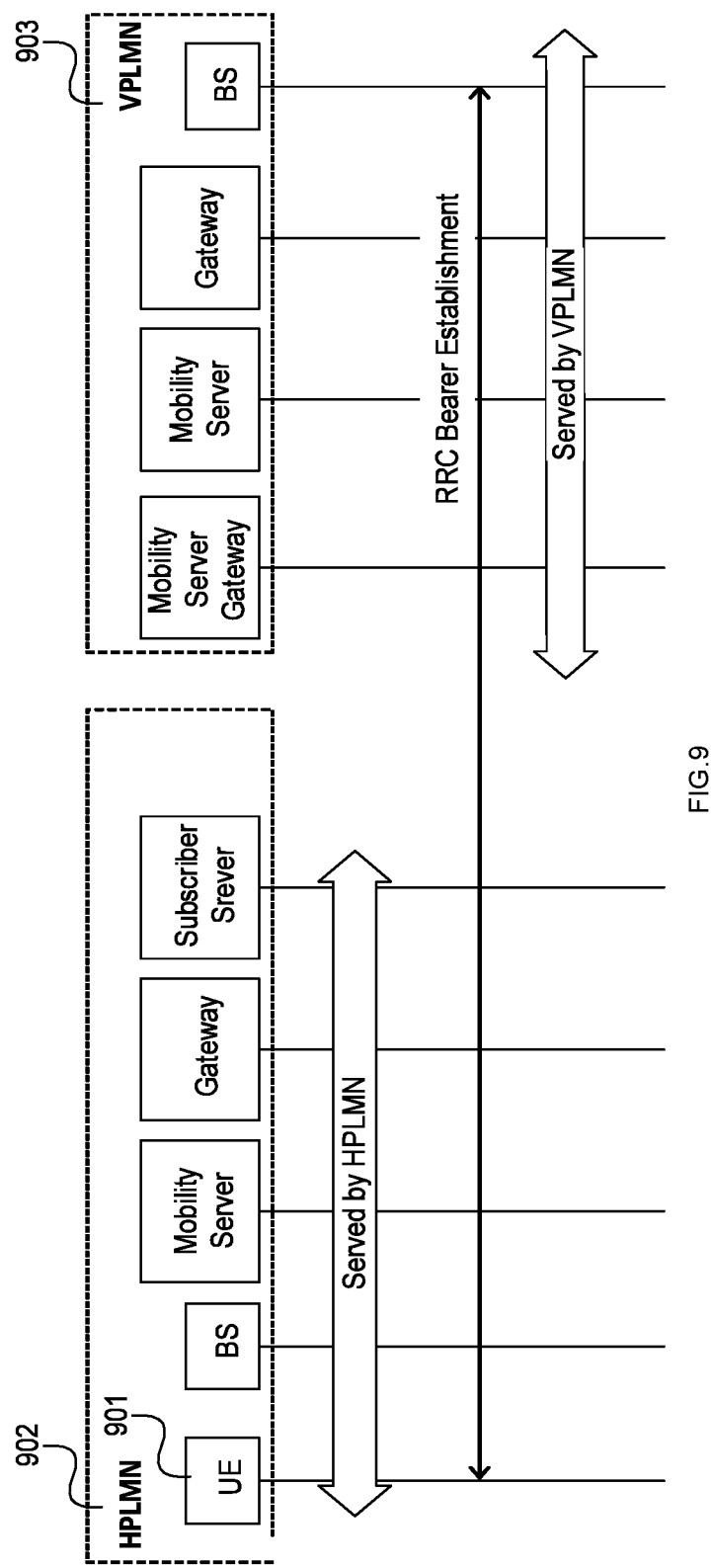
FIG. 9 shows an example of RRC bearer establishment as a user equipment switches from being connected to one network to being connected to another network.

An example of a user equipment switching from being connected to one network to another is shown in FIG. 9. User equipment 901 switches from being connected to HPLMN 902 to being connected to VPLMN 903. The user equipment performs a radio bearer establishment. For networks that the configured to operate in accordance with a 3GPP LTE standard, this radio bearer establishment is essentially a new RRC bearer establishment with the VPLMN. The older RRC bearer with the HPLMN will remain until its timer expires.

Figure 10:
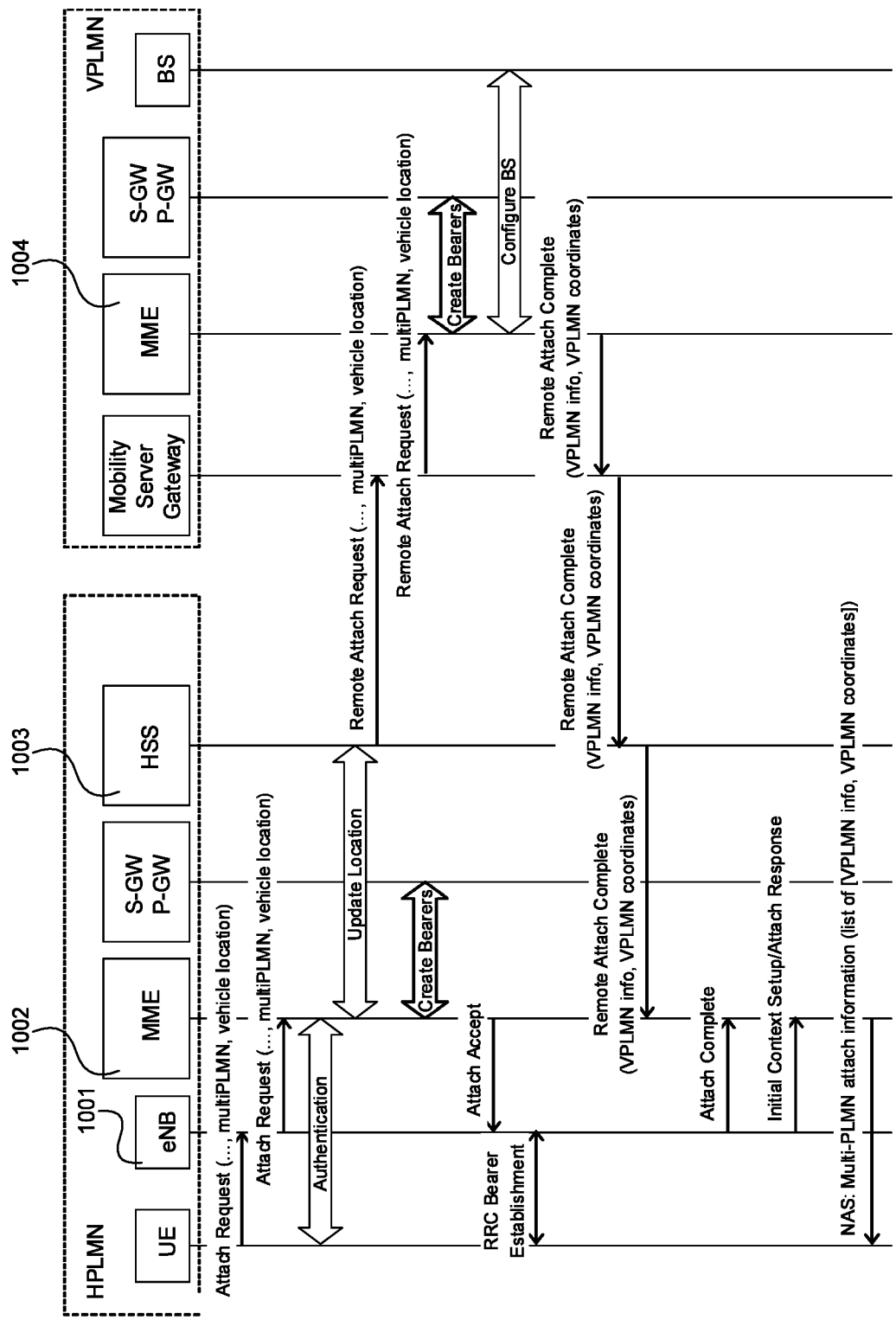
FIG. 10 shows an example of an LTE implementation of a network-coordinated signalling exchange for a user equipment to achieve multi-attach in a multi-network domain.

A further example of a signalling exchange according to one specific implementation is shown in FIG. 10. FIG. 10 illustrates a multi-attach process as it might be implemented in the multi-operator domain of an LTE network. The concepts described herein cause a modification of the typical attach process executed by an eNB (1001), MMEs (1002, 1004) and an HSS (1004).

Figure 11:
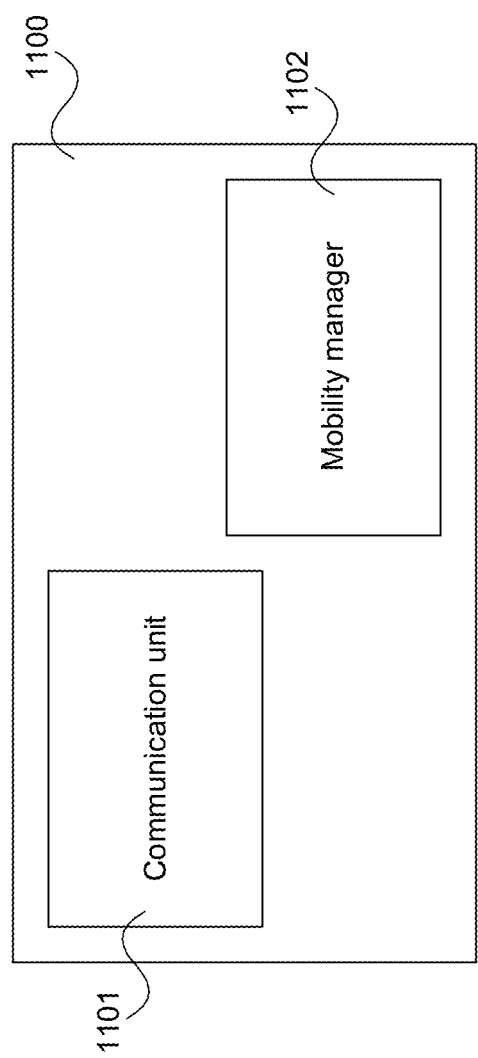
FIG. 11 shows an example of a network gateway according to one embodiment of the invention.

A specific example of a network gateway for protecting the topology of a network is shown in FIG. 11. The network gateway 1100 comprises a communication unit 1101, which may be configured to communicate via a wired or wireless connection with other devices in the network that the network gateway is part of. The communication unit is also in one embodiment configured to receive an attachment request that has originated from a different network from the network that the gateway is part of. The attachment request suitably relates to an end device that wants to attach to the gateway's network. The network gateway includes a mobility manager 1102 that is suitably configured to identify a component within the gateway's network for implementing the requested attachment. That component might, for example, be a mobility server or any other component in the core of the gateway's network. The communication unit then suitably forwards the attachment request to the identified component. The network gateway is thus configured to protect the topology of the first network from being exposed to the second network.

Figure 12:
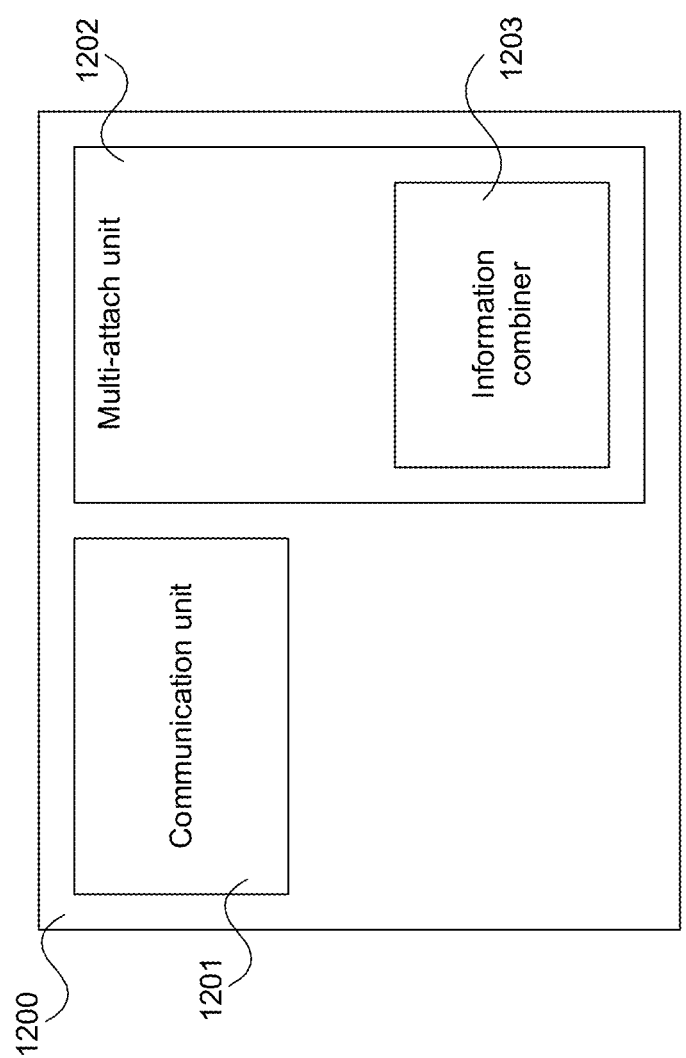
FIG. 12 shows an example of a network device according to one embodiment of the invention.

An example of a network device for implementing a multi-attach procedure is shown in FIG. 12. The network device 1200 comprises a communication unit 1201, which may be configured to communicate via a wired or wireless connection with other devices in the network that the network device is part of. In particular, the communication unit is configured to receive a multi-attach request from an end device. The network device comprises a multi-attach unit 1202 that is configured to recognise that the request is a multi-attach request. The multi-attach unit may be configured to identify all networks that are available. It also controls the communication unit to send a multi-attach request to all available networks. In some embodiments, sending the multi-attach request to the other networks may simply involve the communication unit forwarding the request from the end device onto those networks. The communication unit subsequently receives an attachment confirmation from each of the other networks confirming that an attach process in respect of the end device is complete.

The communication unit 1201 may receive configuration information from the one or more other networks to enable the end device to communicate with each of those networks. This information may include e.g. the eNB to be used from a plurality of eNBs of the same operator available in an area, scheduled timing intervals, allocated frequencies, power control parameters etc. Suitably that information is received as part of the attachment configuration. The communication unit may be configured to pass each message from the other networks to the multi-attach unit 1202, in which information combiner 1203 may be configured to extract the configuration information from each of the messages from the other networks, collect that information together and forward it to the end device in a single information message.

Again, the structures shown in FIGS. 11 and 12 are intended to correspond to a number of functional blocks. This is for illustrative purposes only. FIGS. 11 and 12 are not intended to define a strict division between different parts of hardware on a chip or between different programs, procedures or functions in software. In some embodiments, some or all of the signalling techniques described herein will be coordinated wholly or partly by a processor acting under software control. That software can be embodied in a non-transitory machine readable storage medium having stored thereon processor executable instructions for implementing some or all of the signalling procedures described herein. Both the network gateway and the network device could be implemented by any suitable including apparatus (including by apparatus that also performs other functions in the network). In one example the network gateway may be implemented by a server. In one example the network device may be implemented by a server such as a mobility server.

Some or all of the concepts described herein implement a scheme in which all devices in a particular geographical area use the same network. For example, all vehicles moving inside a pre-defined geographical area will communicate using the same network. This implies that all vehicles moving inside a pre-defined geographical area will communicate using the same operator. Embodiments of the invention are able to tackle one of the main obstacles to the deployment of one of the most interesting use cases for future cellular systems, which is the global support of autonomous driving. Embodiments of the invention are also applicable to devices that have to operate under different network slices in the domain of a single operator.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present embodiments of the present invention may consist of any such individual feature or combination of features. In view of the foregoing description it will be evident to a person skilled in the art that various modifications may be made within the scope of the embodiments of the present invention.

The invention claimed is:

1. A device for operating in a communication system that comprises a plurality of networks, the device comprising:
    a processor configured to:
        assist the device to attach to a network by at least two subscriber modules, the number of the at least two subscriber modules being fewer than the number of the plurality of networks;
        initiate an attach request to pre-attach the device to the plurality of networks by a pre-attach procedure with a plurality of networks, and attach each of the at least two subscribers modules to one of the plurality of networks before establishing a connection with one of the plurality of networks, wherein the attach request comprises an indication the device needs to attach to more than one networks, wherein the processor is configured to initiate the pre-attach procedure dependent upon triggering events including one or more of: switch-on of the device; a determination that the device is approaching a border of a zone that is assigned to a different network of the plurality of networks from a network that the device is currently attached to; or receipt of information from a network relating to at least one of network loading or a type of service that can be accessed through one or more of the plurality networks; and
    a transceiver configured to:
        connect to one network of the plurality of networks for communicating data with the one network while remaining attached to others of the plurality of networks, wherein the transceiver is configured to connect to the one network of the plurality of networks dependent upon parameters including one or more of: a location of the device, a load of one or more of the plurality of networks, or a type of service that can be accessed through one or more of the plurality of networks,
    wherein the processor is configured to operate in a connected mode with respect to a network with which the processor is connected and in an idle mode with respect to a network to which the processor is attached.

2. The device as claimed in claim 1, wherein the transceiver is configured to connect to the one network of the plurality of networks dependent upon configuration information about the one network that the transceiver receives from a network during the pre-attach procedure or that the transceiver receives from a network during a connection with another network of the plurality of networks.

3. The device as claimed in claim 1, wherein the transceiver is configured to switch to being connected to another network of the plurality of networks dependent upon at least one of an internally-generated instruction or an externally-generated instruction received from one network of the plurality of networks.

4. A method comprising:
    operating, by a device, in a communication system that comprises a plurality of networks;
    initiating, by the device, an attach request to pre-attach the device to the plurality of networks by a pre-attach procedure with the plurality of networks, and attaching each of at least two subscriber modules of the device to one of the plurality of networks before establishing a connection with one of the plurality of networks, wherein the device comprises the at least two subscriber modules for assisting the device to attach to a network, the number of the at least two subscriber modules being fewer than the number of the plurality of networks, wherein the attach request comprises an indication the device needs to attach to more than one networks, wherein the initiating the attach request to pre-attach the device to the plurality of networks by the pre-attach procedure is dependent upon triggering events including one or more of switch-on of the device; a determination that the device is approaching a border of a zone that is a assigned to a different network of the plurality of networks from a network that the device is currently attached to; or receipt of information from a network relating to at least one of network loading or a type of service that can be accessed through one or more of the plurality networks;
    connecting, by the device, to one network of the plurality of networks for communicating data with the one network while remaining attached to others of the plurality of networks, wherein the connecting to the one network of the plurality of networks is dependent upon parameters including one or more of: a location of the device, a load of one or more of the networks, or a type of service that can be accessed through one or more of the plurality of networks; and operating, by the device, in a connected mode with respect to a network with which the device is connected and operating, by the device, in an idle mode with respect to a network to which the device is attached.

5. The method as claimed in claim 4, wherein the connecting to the one network of the plurality of networks is dependent upon configuration information about that network that the device receives from a network during the pre-attach procedure or that the device receives from a network during a connection with another network of the plurality of networks.

6. The method as claimed in claim 4, further comprising: switching to being connected to another network of the plurality of networks dependent upon at least one of an internally-generated instruction or in an externally-generated instruction received from one network of the plurality of networks.

7. A computer program product comprising a non-transitory computer-readable medium storing computer executable instructions, wherein the instructions comprises:
instructions for a device operating in a communication system that comprises a plurality of networks to initiate an attach request to pre-attach the device to the plurality of networks by a pre-attach procedure with the plurality of networks, and attach each of at least two subscriber modules of the device to one of the plurality of networks before establishing a connection with one of the plurality of networks, wherein the device comprises the at least two subscriber modules for assisting the device to pre-attach to a network, the number of the at least two subscriber modules being fewer than the number of the plurality of networks, wherein the attach request comprises an indication the device needs to attach to more than one networks, wherein the instructions to initiate the attach request to pre-attach the device to the plurality of networks by the pre-attach procedure is dependent upon triggering events including one or more of: switch-on of the device; a determination that the device is approaching a border of a zone that is assigned to a different network of the plurality of networks from a network that the device is currently attached to: or a receipt of information from a network relating to at least one of network loading or a type of service that can be accessed through one or more of the plurality networks; and
instructions for the device to connect to one network of the plurality of networks for communicating data with the one network while remaining attached to others of the plurality of networks, wherein the instructions f or the device to connect to the one network of the plurality of networks is dependent upon parameters including one or more of a location of the device, a load of one or more of the networks, or a type of service that can be accessed through one or more of the plurality of networks, and
instructions for the device to operate in a connected mode with respect to a network with which the device is connected and in an idle mode with respect to a network to which the device is attached.

8. The program product as claimed in claim 7, wherein the instructions for the device to connect to the one network of the plurality of networks is dependent upon configuration information about that network that the device receives from a network during the pre-attach procedure or that the device receives from a network during a connection with another network of the plurality of networks.

9. The program product as claimed in claim 7, wherein the instructions further comprise instructions to switch to being connected to another network of the plurality of networks dependent upon at least one of an internally-generated instruction or in an externally-generated instruction received from one network of the plurality of networks.

* * * * *

UNITED STATES PATENT AND TRADEMARK OFFICE
CERTIFICATE OF CORRECTION

PATENT NO. : 10,945,178 B2
APPLICATION NO. : 16/374312
DATED : March 9, 2021
INVENTOR(S) : Panagiotis Spapis et al.

Page 1 of 1

It is certified that error appears in the above-identified patent and that said Letters Patent is hereby corrected as shown below:

In the Claims

In Claim 1, Column 17, Line 54-55, delete "with a plurality of networks" and insert --with the plurality of networks--.

In Claim 1, Column 17, Line 56, delete "subscribers" and insert --subscriber--.

In Claim 4, Column 18, Line 53, delete "that is a assigned to" and insert --that is assigned to--.

In Claim 7, Column 20, Line 12, delete "f or" and insert --for--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*